United States Patent [19]

Tamemasa et al.

[11] Patent Number: 4,863,510

[45] Date of Patent: Sep. 5, 1989

[54] REDUCTION PROCESS FOR PREPARING COPPER, SILVER, AND ADMIXED SILVER-PALLADIUM METAL PARTICLES

[75] Inventors: Hiroshi Tamemasa; Hiroshi Makino, both of Hiratsuka; Tadao Nagai, Sapporo, all of Japan

[73] Assignee: Tanaka Kikinzoku Kogyo K.K., Japan

[21] Appl. No.: 224,996

[22] Filed: Jul. 27, 1988

[51] Int. Cl.$^4$ ................................................ B22F 9/24
[52] U.S. Cl. .................................. 75/0.5 A; 148/126.1
[58] Field of Search ..................... 75/0.5 A; 148/126.1

[56] References Cited

U.S. PATENT DOCUMENTS 4,477,296 10/1984 Nair ..................................... 75/0.5 A
4,776,883 10/1988 Hayashi et al. ..................... 75/0.5 A

FOREIGN PATENT DOCUMENTS

0179010-A 7/1988 Japan ................................. 75/0.5 A

*Primary Examiner*—Upendra Roy
*Attorney, Agent, or Firm*—Klauber & Jackson

[57] ABSTRACT

Fine particles of a metal such as copper and silver can be obtained by reducing the corresponding metal compound solution with one or more reducing agents selected from the group consisting of L-ascorbic acid, L-ascorbate, D-erythorbic acid and D-erythorbate. Silver-palladium composite particles can also be obtained similarly by employing a colloidal palladium liquid and a silver compound solution.

9 Claims, No Drawings

REDUCTION PROCESS FOR PREPARING COPPER, SILVER, AND ADMIXED SILVER-PALLADIUM METAL PARTICLES

BACKGROUND OF INVENTION

This invention relates to a process for preparing such fine metal particles as copper particles, silver particles and silver-palladium composite particles.

Heretofore, a process for preparing fine copper particles has been employed which consists of reducing copper oxide particles in an aqueous medium by means of a reducing agent such as hydrazine. This process, however, has the disadvantages that since the particle size of the reduced particles depends on the particle size of the oxide particles, the control of the particle size is difficult to attain, and further since the reduced particles draw one another, only the aggregated copper particles having the broad particle size distribution can be obtained.

Moreover, in order to prepare fine silver particles a process has been employed which consists of forming silver oxide by adding sodium hydroxide to a silver nitrate solution, and reducing the silver oxide with formalin. This process, however, has the same disadvantages as those for the above process for preparing the copper particles.

In addition to the above single metal particles, composite metal particles containing two or more metals may be employed. In the electronics industry, electroconductive paste is employed for preparing a thick film circuit, most of which is mixed silver-palladium fine particle paste. The reason the palladium is incorporated into the silver-palladium paste is that migration and solder leaching can be avoided. For this purpose, several % to thirty % of the palladium should be incorporated.

Although the incorporation of the palladium provides considerable effects regarding the above two points, the method of mixing the fine particles of the silver and the palladium cannot uniformly disperse the palladium so that the above effects cannot be realized sufficiently.

SUMMARY OF INVENTION

The present invention has been made to overcome the above disadvantages.

An object of this invention is to provide a process for preparing fine copper particles which have the narrower particle size distribution, the control of which can be easily attained.

Another object of the invention is to provide a process for preparing fine silver particles which have the narrower particle size distribution, the control of which can be easily attained.

A further object of the invention is to provide a process for preparing fine composite silver-palladium particles which have the palladium particles uniformly dispersed in the fine silver particles for improving the characteristics of the Ag-Pd paste.

A main feature of the invention is that a metal compound is reduced by means of one or more reducing agents selected from the group consisting of L-ascorbic acid, L-ascorbate, D-erythorbic acid and D-erythorbate to provide the corresponding fine metal particles. In order to prepare copper particles according to the present invention, a copper sulfate solution or a copper-ammonium complex solution is reduced with the above described reducing agent. Further, in order to prepare silver particles according to the present invention, a silver-ammonium complex solution is reduced by means of the above reducing agent. Moreover, in order to prepare silver-palladium composite particles according to the present invention, after a palladium compound solution is made colloidal by, for example, adding sodium borohydride thereto, the above reducing agent is added to the said colloidal liquid, and a silver compound solution is added to the colloidal liquid to reduce the silver compound.

Detailed Description of Invention

When fine metal particles are prepared by reducing such a metal compound solution as a copper sulfate aqueous solution, a copper ammonium complex salt solution and a silver ammonium complex salt solution by means of one or more reducing agents selected from the group consisting of L-ascorbic acid, L-ascorbate, D-erythorbic acid and D-erythorbate, the corresponding fine metal particles which are monodispersed can be produced. Since the resulting monodispersed fine particles having the narrow particle size distribution of which a particle size can be controlled are obtained, the process of the present invention is epoch-making. Addition of the reducing agent and mixing of the solution and the reducing agent can be conducted under the ordinary conditions. The structural formulae of the L-ascorbic acid and its optical isomer D-erythorbic acid are shown below.

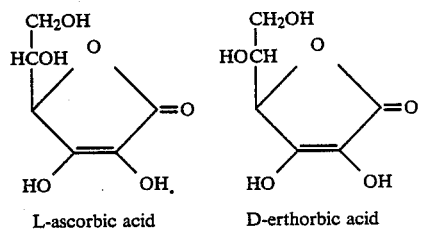

L-ascorbic acid    D-erthorbic acid

In case of preparing silver-palladium composite particles, to a colloidal liquid containing uniformly dispersed palladium which can be prepared by adding a reducing agent to a palladium compound solution is added L-ascorbic acid, L-ascorbate, D-erythorbic acid or D-erythorbate, and further a silver compound solution for reducing the silver compound to silver.

The reason one or more reducing agents selected from the group consisting of L-ascorbic acid, L-ascorbate, D-erythorbic acid and D-erythorbate are employed is that not only the oxidation-reduction potential of the reducing agents is suitable for reducing the metal compound solution but also the reducing agents have the function of preventing aggregation among the particles.

The sodium salt, the potassium salt and the ammonium salt of the L-ascorbic acid or of the D-erythorbic acid can be employed as the L-ascorbate or the D-erythorbate in the invention.

When the copper sulfate aqueous solution is employed, the pH of the solution is preferably adjusted in the range of 0.3 to 5 because the reaction is made slower below the pH 0.3 and a hydroxide of copper is formed above the pH 5. The pH of the L-ascorbic acid or the D-erythorbic acid is preferably adjusted not less than 0.5 because the reaction is extremely made slower below the pH 0.5. Further, the reaction temperature is preferably in the range of 10° to 100° C. because the reaction is made slower below 10° C. and aggregation of the fine copper particles occurs above 100° C.

When the copper ammonium complex salt solution is employed, the pH of the solution is preferably adjusted in the range of 7.5 to 13 because the precipitate of a hydroxide of copper is formed below the pH 7.5 and the reaction is made slower above the pH 13 due to the high evolution rate of ammonia gas. The pH of the L-ascorbic acid or the D-erythorbic acid is preferably adjusted not less than 0.5. Further, the reaction temperature is preferably in the range of 30° to 100° C. because the reaction is made slower below 30° C. and aggregation of the fine copper particles occurs above 100° C.

When the silver ammonium complex salt solution is employed, the pH of the solution is preferably adjusted in the range of 8 to 13 because the precipitate of an oxide of silver is formed below the pH 8 and the reaction is made slower above the pH 13 due to the high evolution rate of ammonia gas. The pH of the L-ascorbic acid or the D-erythorbic acid is preferably adjusted not less than 0.1. Further, the reaction temperature is preferably in the range of 0° to 100° C. because the reaction is made slower below 0° C. and not only aggregation of the fine silver particles occurs but also the width of the particle size distribution is made broader above 100° C.

In case of preparing the silver-palladium composite particles, the solution of a palladium compound such as palladium nitrate, palladium chloride and palladium sulfate is reduced to a colloidal palladium liquid by means of a reducing agent such as sodium borohydride, lithium aluminum hydride and hydrazine, and to this colloidal liquid is added the L-ascorbic acid, the L-ascorbate, the D-erythorbic acid and/or the D-erythorbate and further the aqueous solution of a silver compound such as ammoniacal silver nitrate complex, silver nitrate and silver sulfate for reducing the compound to silver. The pH of the L-ascorbic acid or the D-erythorbic acid is preferably adjusted not less than 0.1. Further, the reaction temperature is preferably in the range of 0° to 100° C.

Although the particle size of the palladium dispersed in the silver particles is not restricted, no larger than 100 Å is preferable in view of the characteristics employed as paste.

In the resulting composite particles, the reduced palladium particles are uniformly dispersed in the silver particles so that when the particles are applied to paste, a silver-palladium film in which the palladium is uniformly dispersed can be obtained which has not been heretofore obtained.

The present invention will now be described in detail in connection with the following Examples and the Comparative Examples which are intended to be illustrative of the invention but not limitative.

EXAMPLE 1

After 197 g of copper sulfate crystals were dissolved in water to provide a 1 l aqueous solution, diluted sulfuric acid was added thereto to adjust the pH of the solution to 1. After, on the other hand, 200 g of L-ascorbic acid was dissolved in water to provide a 1 l aqueous solution, sodium hydroxide was added thereto to adjust the pH of the solution to 7. The temperatures of these two solutions were made to 30° C., and then the L-ascorbic acid solution was added to the copper sulfate solution with stirring for reacting the two compounds for additional five minutes.

After the resulting copper particles were filtered and washed, the particle size distribution was measured and the particles were observed by an electron microscope. It was found by this analysis that the copper particles were almost spherical having the average particle size of 1.2 μm and had the sharp particle distribution, 70% of the particles ranging from 0.8 to 1.5 μm.

EXAMPLE 2

After 126 g of copper sulfate crystals were dissolved in water to provide a 1 l aqueous solution, diluted sulfuric acid was added thereto to adjust the pH of the solution to 3. After, on the other hand, 128 g of L-ascorbic acid was dissolved in water to provide a 1 l aqueous solution, sodium hydroxide was added thereto to adjust the pH of the solution to 5. The temperatures of these two solutions were made to 70° C., and then the L-ascorbic acid solution was added to the copper sulfate solution with stirring for reacting the two compounds for additional three minutes.

The resulting copper particles were treated and analyzed by the method described in Example 1. It was found by this analysis that the copper particles were polyhedral having the average particle size of 1.8 μm and had the sharp particle distribution, 70% of the particles ranging from 1.5 to 2.5 μm.

EXAMPLE 3

After 197 g of copper sulfate crystals were dissolved in water to provide a 1 l aqueous solution, diluted sulfuric acid was added thereto to adjust the pH of the solution to 1. On the other hand, 200 g of sodium L-ascorbate was dissolved in water to provide a 1 l aqueous solution. The temperatures of these two solutions were made to 20° C., and then the sodium L-ascorbate solution was added to the copper sulfate solution with stirring for reacting the two compounds for additional five minutes.

The resulting copper particles were treated and analyzed by the method described in Example 1. It was found by this analysis that the copper particles were almost spherical having the average particle size of 1.0 μm and had the sharp particle distribution, 70% of the particles ranging from 0.7 to 1.3 μm.

EXAMPLE 4

The fine copper particles were obtained by the method described in Example 1 except that D-erythorbic acid was employed in place of the L-ascorbic acid and the pHs of the solution after the addition of the diluted sulfuric acid and of the sodium hydroxide were respectively adjusted to 1.5 and 6.

The resulting copper particles were treated and analyzed by the method described in Example 1. It was found by this analysis that the copper particles were almost spherical having the average particle size of 1.5 μm and had the sharp particle distribution, 70% of the particles ranging from 1.1 to 1.8 μm.

EXAMPLE 5

After 126 g of copper sulfate crystals were dissolved in water to provide a 1 l aqueous solution, diluted sulfuric acid was added thereto to adjust the pH of the solution to 4. After, on the other hand, 128 g of D-erythorbic acid was dissolved in water to provide a 1 l aqueous solution, sodium hydroxide was added thereto to adjust the pH of the solution to 10. The temperatures of these two solutions were made to 70° C., and then the D-erythorbic acid solution was added to the copper sulfate solution with stirring for reacting the two compounds for additional ten minutes.

The resulting copper particles were treated and analyzed by the method described in Example 1. It was found by this analysis that the copper particles were polyhedral having the average particle size of 2.0 μm and had the sharp particle distribution, 70% of the particles ranging from 1.7 to 2.3 μm.

EXAMPLE 6

The fine copper particles were obtained by the method described in Example 3 except that sodium D-erythorbate was employed in place of the sodium L-ascorbate.

The resulting copper particles were treated and analyzed by the method described in Example 1. It was found by this analysis that the copper particles were almost spherical having the average particle size of 0.8 μm and had the sharp particle distribution, 70% of the particles ranging from 0.5 to 1.1 μm.

EXAMPLE 7

After 197 g of copper sulfate crystals were dissolved in water to provide a 1 l aqueous solution, 28% aqueous ammonia was added thereto to form a copper ammonium complex solution and to adjust the pH of the solution to 9. After, on the other hand, 200 g of L-ascorbic acid was dissolved in water to provide a 1 l aqueous solution, sodium hydroxide was added thereto to adjust the pH of the solution to 2.5. The temperatures of these two solutions were made to 30° C., and then the L-ascorbic acid solution was added to the copper ammonium complex solution with stirring for reacting the two compounds for additional 30 minutes.

The resulting copper particles were treated and analyzed by the method described in Example 1. It was found by this analysis that the copper particles were almost spherical having the average particle size of 1.0 μm and had the sharp particle distribution, 70% of the particles ranging from 0.8 to 1.3 μm.

EXAMPLE 8

After 126 g of copper sulfate crystals were dissolved in water to provide a 1 l aqueous solution, 28% aqueous ammonia was added thereto to form a copper ammonium complex solution and to adjust the pH of the solution to 12. After, on the other hand, 128 g of L-ascorbic acid was dissolved in water to provide a 1 l aqueous solution, 28% aqueous ammonia was added thereto to adjust the pH of the solution to 5. The temperatures of these two solutions were made to 60° C., and then the L-ascorbic acid solution was added to the copper ammonium complex solution with stirring for reacting the two compounds for additional 30 minutes.

The resulting copper particles were treated and analyzed by the method described in Example 1. It was found by this analysis that the copper particles were polyhedral having the average particle size of 1.7 μm and had the sharp particle distribution, 70% of the particles ranging from 1.3 to 2.0 μm.

EXAMPLE 9

After 197 g of copper sulfate crystals were dissolved in water to provide a 1 l aqueous solution, 28% aqueous ammonia was added thereto to form a copper ammonium complex solution and to adjust the pH of the solution to 8. On the other hand, 200 g of sodium L-ascorbate was dissolved in water to provide a 1 l aqueous solution. The temperatures of these two solutions were made to 50° C., and then the sodium L-ascorbate solution was added to the copper ammonium complex solution with stirring for reacting the two compounds for additional 50 minutes.

The resulting copper particles were treated and analyzed by the method described in Example 1. It was found by this analysis that the copper particles were polyhedral having the average particle size of 0.8 μm and had the sharp particle distribution, 70% of the particles ranging from 0.5 to 1.2 μm.

EXAMPLE 10

After 197 g of copper sulfate crystals were dissolved in water to provide a 1 l aqueous solution, 28% aqueous ammonia was added thereto to form a copper ammonium complex solution and to adjust the pH of the solution to 9.5. After, on the other hand, 200 g of D-erythorbic acid was dissolved in water to provide a 1 l aqueous solution, 28% aqueous ammonia was added thereto to adjust the pH of the solution to 3. The temperatures of these two solutions were made to 90° C., and then the D-erythorbic acid solution was added to the copper ammonium complex solution with stirring for reacting the two compounds for additional 30 minutes.

The resulting copper particles were treated and analyzed by the method described in Example 1. It was found by this analysis that the copper particles were almost spherical having the average particle size of 1.5 μm and had the sharp particle distribution, 70% of the particles ranging from 1.1 to 1.8 μm.

EXAMPLE 11

After 126 g of copper sulfate crystals were dissolved in water to provide a 1 l aqueous solution, 28% aqueous ammonia was added thereto to form a copper ammonium complex solution and to adjust the pH of the solution to 11. After, on the other hand, 128 g of D-erythorbic acid was dissolved in water to provide a 1 l aqueous solution, 28% aqueous ammonia was added thereto to adjust the pH of the solution to 4.5. The temperatures of these two solutions were made to 70° C., and then the D-erythorbic acid solution was added to the copper ammonium complex solution with stirring for reacting the two compounds for additional 40 minutes.

The resulting copper particles were treated and analyzed by the method described in Example 1. It was found by this analysis that the copper particles were polyhedral having the average particle size of 1.8 μm and had the sharp particle distribution, 70% of the particles ranging from 1.5 to 2.0 μm.

EXAMPLE 12

After 197 g of copper sulfate crystals were dissolved in water to provide a 1 l aqueous solution, 28% aqueous ammonia was added thereto to form a copper ammonium complex solution and to adjust the pH of the solution to 7.5. On the other hand, 200 g of sodium D-erythorbate was dissolved in water to provide a 1 l aqueous solution. The temperatures of these two solutions were made to 60° C., and then the sodium D-erythorbate solution was added to the copper ammonium complex solution with stirring for reacting the two compounds for additional 60 minutes.

The resulting copper particles were treated and analyzed by the method described in Example 1. It was found by this analysis that the copper particles were almost spherical having the average particle size of 0.9 μm and had the sharp particle distribution, 70% of the particles ranging from 0.6 to 1.4 μm.

COMPARATIVE EXAMPLE A 50 g of cupric oxide having the average particle size of 5 μm was dispersed and suspended in 1000 ml water with stirring. After the temperature of this liquid was raised to 70° C. with further stirring and 200 ml of a 80% hydrazine hydrate aqueous solution was added thereto, the stirring was continued at 70° C. for two hours.

The resulting copper particles were treated and analyzed by the method described in Example 1. It was found by this analysis that the copper particles were amorphous and aggregated having the average particle size of 3.5 μm and had the broad particle distribution ranging from 0.5 to 10 μm.

EXAMPLE 13

After 50 g of silver nitrate crystals were dissolved in water to provide a 1 l aqueous solution, 28% aqueous ammonia was added thereto to form a silver ammonium complex solution and to adjust the pH of the solution to 10. After, on the other hand, 30 g of L-ascorbic acid was dissolved in water to provide a 500 ml aqueous solution, 28% aqueous ammonia was added thereto to adjust the pH of the solution to 2. The temperatures of these two solutions were made to 20° C., and then the L-ascorbic acid solution was added to the silver ammonium complex solution with stirring for reacting the two compounds for additional four minutes.

The resulting silver particles were treated and analyzed by the method described in Example 1. It was found by this analysis that the silver particles were spherical having the average particle size of 0.1 μm and had the sharp particle distribution, 70% of the particles ranging from 0.07 to 0.13 μm.

EXAMPLE 14

After 40 g of silver nitrate crystals were dissolved in water to provide a 1 l aqueous solution, 28% aqueous ammonia was added thereto to form a silver ammonium complex solution and to adjust the pH of the solution to 8. After, on the other hand, 30 g of L-ascorbic acid was dissolved in water to provide a 500 ml aqueous solution, 28% aqueous ammonia was added thereto to adjust the pH of the solution to 12. The temperatures of these two solutions were made to 10° C., and then the L-ascorbic acid solution was added to the silver ammonium complex solution with stirring for reacting the two compounds for additional two minutes.

The resulting silver particles were treated and analyzed by the method described in Example 1. It was found by this analysis that the silver particles were spherical having the average particle size of 0.5 μm and had the sharp particle distribution, 70% of the particles ranging from 0.3 to 0.8 μm.

EXAMPLE 15

After 250 g of silver nitrate crystals were dissolved in water to provide a 1 l aqueous solution, 28% aqueous ammonia was added thereto to form a silver ammonium complex solution and to adjust the pH of the solution to 12. On the other hand, 130 g of sodium L-ascorbate was dissolved in water to provide a 500 ml aqueous solution. The temperatures of these two solutions were made to 50° C., and then the sodium L-ascorbate solution was added to the silver ammonium complex solution with stirring for reacting the two compounds for additional six minutes.

The resulting silver particles were treated and analyzed by the method described in Example 1. It was found by this analysis that the silver particles were spherical having the average particle size of 1.0 μm and had the sharp particle distribution, 70% of the particles ranging from 0.8 to 1.3 μm.

EXAMPLE 16

After 50 g of silver nitrate crystals were dissolved in water to provide a 1 l aqueous solution, 28% aqueous ammonia was added thereto to form a silver ammonium complex solution and to adjust the pH of the solution to 8. After, on the other hand, 30 g of D-erythorbic acid was dissolved in water to provide a 500 ml aqueous solution, 28% aqueous ammonia was added thereto to adjust the pH of the solution to 3. The temperatures of these two solutions were made to 20° C., and then the D-erythorbic acid solution was added to the silver ammonium complex solution with stirring for reacting the two compounds for additional two minutes.

The resulting silver particles were treated and analyzed by the method described in Example 1. It was found by this analysis that the silver particles were spherical having the average particle size of 0.2 μm and had the sharp particle distribution, 70% of the particles ranging from 0.17 to 0.23 μm.

EXAMPLE 17

After 40 g of silver nitrate crystals were dissolved in water to provide a 1 l aqueous solution, 28% aqueous ammonia was added thereto to form a silver ammonium complex solution and to adjust the pH of the solution to 12. After, on the other hand, 30 g of D-erythorbic acid was dissolved in water to provide a 500 ml aqueous solution, 28% aqueous ammonia was added thereto to adjust the pH of the solution to 10. The temperatures of these two solutions were made to 10° C., and then the D-erythorbic acid solution was added to the silver ammonium complex solution with stirring for reacting the two compounds for additional four minutes.

The resulting silver particles were treated and analyzed by the method described in Example 1. It was found by this analysis that the silver particles were spherical having the average particle size of 0.5 μm and had the sharp particle distribution, 70% of the particles ranging from 0.3 to 0.8 μm.

EXAMPLE 18

After 250 g of silver nitrate crystals were dissolved in water to provide a 1 l aqueous solution, 28% aqueous ammonia was added thereto to form a silver ammonium complex solution and to adjust the pH of the solution to 12. On the other hand, 130 g of sodium D-erythorbate was dissolved in water to provide a 500 ml aqueous solution. The temperatures of these two solutions were made to 50° C., and then the sodium D-erythorbate solution was added to the silver ammonium complex solution with stirring for reacting the two compounds for additional six minutes.

The resulting silver particles were treated and analyzed by the method described in Example 1. It was found by this analysis that the silver particles were spherical having the average particle size of 1.5 μm and had the sharp particle distribution, 70% of the particles ranging from 1.3 to 1.7 μm.

COMPARATIVE EXAMPLE B 15 g of silver nitrate was dissolved in 30 ml of water, and a 48% sodium hydroxide aqueous solution was added thereto to precipitate silver oxide particles. These particles were reduced to silver particles with formalin.

The resulting silver particles were treated and analyzed by the method described in Example 1. It was found by this analysis that the silver particles were an aggregate having the average particle size of 6.2 μm and had the broad particle distribution.

EXAMPLE 19

To 150 ml of a palladium nitrate aqueous solution (50 g/l) was added sodium borohydride to prepare a colloidal liquid containing palladium particles (particle size: 100 to 500 Å) uniformly dispersed therein.

To this colloidal liquid was added 150 ml of an L-ascorbic acid aqueous solution (100 g/l), and further added 700 ml of an ammoniacal silver nitrate complex aqueous solution (50 g/l) for reducing the metal compounds. The resulting particles after filtration and washing were silver particles containing palladium particles uniformly and finely dispersed therein. The particles were analyzed by an electron scanning microscope, X-ray diffraction and chemical analysis. The particles were found to be almost spherical Ag (80%)-Pd (20%) fine composite particles having the average particle size of 0.5 μm.

After the Ag-Pd composite particles prepared in this Example were pasted and the screen process printing on an alumina substrate was performed using the pasted particles, the substrate was baked at 900° C. for 30 minutes to form an Ag-Pd thick film circuit. The migration test of Ag and the solder leaching test were carried out using the circuit. The average time until first migration occurs was 8 minutes and 20 seconds for the Ag-Pd composite particles, and little solder leaching was observed after the solder dipping test was repeated ten times.

When the Ag-Pd composite particles of this Example are pasted after the particles are heat-treated at 200° to 500° C., a longer time until first migration of Ag occurs can be attained.

COMPARATIVE EXAMPLE C

Ag fine particles (80%) having the average particle size of 1.0 μm and Pd fine particles (20%) having the average particle size of 1.2 μm were mixed and pasted and the screen process printing on an alumina substrate was performed using the pasted particles, the substrate was baked at 900° C. for 30 minutes to form an Ag-Pd thick film circuit. The migration test of Ag and the solder leaching test were carried out using the circuit. The average time until first migration occurs was 2 minutes and 30 seconds, and considerable solder leaching was observed after the solder dipping test was repeated five times.

What is claimed is:

1. A process for preparing fine metal particles selected from the group consisting of copper particles, silver particles and silver-palladium composite particles which comprises reducing a solution of a copper compound or of a silver compound by means of one or more reducing agents selected from the group consisting of L-ascorbic acid, L-ascorbate, D-erythorbic acid and D-erythorbate or adding to a colloidal palladium liquid one or more of said reducing agents and a solution of a silver compound to reduce the silver compound to prepare the silver particles containing the palladium particles dispersed therein.

2. A process according to claim 1 for preparing fine copper particles wherein a copper sulfate solution is reduced employing one or more reducing agents selected from the group consisting of L-ascorbic acid, L-ascorbate, D-erythorbic acid and D-erythorbate to produce the fine copper particles.

3. A process according to claim 1 for preparing fine copper particles wherein a copper ammonium complex solution is reduced employing one or more reducing agents selected from the group consisting of L-ascorbic acid, L-ascorbate, D-erythorbic acid and D-erythorbate to produce the fine copper particles.

4. A process according to claim 1 for preparing fine silver particles wherein a silver ammonium complex solution is reduced employing one or more reducing agents selected from the group consisting of L-ascorbic acid, L-ascorbate, D-erythorbic acid and D-erythorbate to prepare the monodispersed fine silver particles.

5. A process according to claim 1 for preparing fine silver-palladium composite particles wherein to a colloidal palladium liquid is added one or more reducing agents selected from the group consisting of L-ascorbic acid, L-ascorbate, D-erythorbic acid and D-erythorbate, and further is added a silver compound solution for reducing the silver compound to produce the silver particles containing the palladium particles uniformly dispersed therein.

6. The process as claimed in claim 2 wherein the pH of the copper sulfate solution is adjusted in the range from 0.3 to 5, and the reaction temperature is adjusted in the range from 10° to 100° C.

7. The process as claimed in claim 3 wherein the pH of the copper ammonium complex solution is adjusted in the range from 7.5 to 13, and the reaction temperature is adjusted in the range from 30° to 100° C.

8. The process as claimed in claim 4 wherein the pH of the silver ammonium complex solution is adjusted in the range from 8 to 13, and the reaction temperature is adjusted in the range from 0° to 100° C.

9. The process as claimed in claim 5 wherein the colloidal palladium liquid is prepared by reducing a palladium compound solution with sodium borohydride.

* * * * *